United States Patent
Tegel et al.

(10) Patent No.: US 6,260,475 B1
(45) Date of Patent: Jul. 17, 2001

(54) MANUALLY OPERATED COFFEE BEAN PRESS

(76) Inventors: Clio Tegel; Warwick Smith, both of 12A Birnam Rd., London N4 3LQ (GB)

( * ) Notice: Subject to any disclaimer, the term of this patent is extended or adjusted under 35 U.S.C. 154(b) by 0 days.

(21) Appl. No.: 09/697,839

(22) Filed: Oct. 26, 2000

(51) Int. Cl.[7] ................ A23L 1/00; A47J 31/00; A47J 31/24; B30B 9/32

(52) U.S. Cl. ................ 99/286; 99/287; 99/349; 99/495; 100/98 R; 100/125; 100/233; 100/258 A; 100/293; 100/295

(58) Field of Search .......... 99/286, 287, 289 R, 99/302 P, 295, 299, 349, 495, 509, 510; 100/98 R, 125, 131, 233, 245, 258 A, 292, 293, 289, 295, 99, 211, 231, 257, 259, 319, 320; 426/433, 435

(56) References Cited

U.S. PATENT DOCUMENTS

| | | | | |
|---|---|---|---|---|
| D. 386,503 | * | 11/1997 | Emerson | D15/123 |
| 3,988,981 | * | 11/1976 | McDonald | 100/99 |
| 4,011,809 | * | 3/1977 | Waller et al. | 100/257 X |
| 4,377,108 | * | 3/1983 | Rais | 99/290 |
| 4,936,199 | * | 6/1990 | Ruggin et al. | 99/287 X |
| 4,958,557 | * | 9/1990 | Fiala | 99/495 |
| 5,127,318 | * | 7/1992 | Selby, III | 99/295 |
| 5,445,562 | * | 8/1995 | Brunell et al. | 100/293 X |
| 5,520,105 | * | 5/1996 | Healy | 99/349 X |
| 5,584,239 | * | 12/1996 | Yelczyn et al. | 100/293 X |
| 5,618,570 | * | 4/1997 | Banks et al. | 426/435 |
| 5,722,313 | * | 3/1998 | Schmed | 99/289 R |
| 5,809,867 | * | 9/1998 | Turner et al. | 99/287 X |

\* cited by examiner

Primary Examiner—Timothy F. Simone

(57) ABSTRACT

A manually operated coffee bean press for ensuring the proper extraction of coffee. The manually operated coffee bean press includes a frame. The frame includes a base and a leg. The leg includes a first end, a second end, and a front side and a back side with a peripheral wall extending therebetween. The frame also includes a shelf comprising a plate integrally coupled to the leg. The coffee bean pressing apparatus also includes a cylinder integrally coupled to the leg. The coffee bean pressing apparatus further comprises a piston member including a shaft being positioned in the cylinder. The shaft includes a hole with a lever removably coupled to it. The lever is hingedly coupled to the leg by a hinging member.

17 Claims, 3 Drawing Sheets

MANUALLY OPERATED COFFEE BEAN PRESS

BACKGROUND OF THE INVENTION

1. Field of the Invention

The present invention relates to presses and more particularly pertains to a new manually operated coffee bean press for ensuring the proper extraction of coffee.

2. Description of the Prior Art

The use of press is known in the prior art. More specifically, presses heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,988,981; U.S. Pat. No. 4,011,809; U.S. Pat. No. 4,936,199; U.S. Pat. No. 5,127,318; U.S. Pat. No. 5,445,562; and U.S. Pat. No. 5,722,313; U.S. Pat. No. Des. 386,503.

While these devices fulfill their respective, particular objectives and requirements, the aforementioned patents do not disclose a new manually operated coffee bean press. The inventive device includes a frame. The frame includes a base and a leg. The leg includes a first end, a second end, and a front side and a back side with a peripheral wall extending therebetween. The frame also includes a shelf comprising a plate integrally coupled to the leg. The coffee bean pressing apparatus also includes a cylinder integrally coupled to the leg. The coffee bean pressing apparatus further comprises a piston member including a shaft being positioned in the cylinder. The shaft includes a hole with a lever removably coupled to it. The lever is hingedly coupled to the leg by a hinging member.

In these respects, the manually operated coffee bean press according to the present invention substantially departs from the conventional concepts and designs of the prior art, and in so doing provides an apparatus primarily developed for the purpose of ensuring the proper extraction of coffee.

SUMMARY OF THE INVENTION

In view of the foregoing disadvantages inherent in the known types of press now present in the prior art, the present invention provides a new manually operated coffee bean press construction wherein the same can be utilized for ensuring the proper extraction of coffee.

The general purpose of the present invention, which will be described subsequently in greater detail, is to provide a new manually operated coffee bean press apparatus and method which has many of the advantages of the press mentioned heretofore and many novel features that result in a new manually operated coffee bean press which is not anticipated, rendered obvious, suggested, or even implied by any of the prior art press, either alone or in any combination thereof.

To attain this, the present invention generally comprises a manually operated coffee bean pressing apparatus comprising a frame. The frame includes a base and a leg. The leg includes a first end, a second end, and a front side and a back side with a peripheral wall extending therebetween. The frame also includes a shelf comprising a plate integrally coupled to the leg. The coffee bean pressing apparatus also includes a cylinder integrally coupled to the leg. The coffee bean pressing apparatus further comprises a piston member including a shaft being positioned in the cylinder. The shaft includes a hole with a lever removably coupled to it. The lever is hingedly coupled to the leg by a hinging member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new manually operated coffee bean press apparatus and method which has many of the advantages of the press mentioned heretofore and many novel features that result in a new manually operated coffee bean press which is not anticipated, rendered obvious, suggested, or even implied by any of the prior art press, either alone or in any combination thereof.

It is another object of the present invention to provide a new manually operated coffee bean press which may be easily and efficiently manufactured and marketed.

It is a further object of the present invention to provide a new manually operated coffee bean press which is of a durable and reliable construction.

An even further object of the present invention is to provide a new manually operated coffee bean press which is susceptible of a low cost of manufacture with regard to both materials and labor, and which accordingly is then susceptible of low prices of sale to the consuming public, thereby making such manually operated coffee bean press economically available to the buying public.

Still yet another object of the present invention is to provide a new manually operated coffee bean press which provides in the apparatuses and methods of the prior art some of the advantages thereof, while simultaneously overcoming some of the disadvantages normally associated therewith.

Still another object of the present invention is to provide a new manually operated coffee bean press for ensuring the proper extraction of coffee.

Yet another object of the present invention is to provide a new manually operated coffee bean press which includes a frame. The frame includes a base and a leg. The leg includes a first end, a second end, and a front side and a back side with a peripheral wall extending therebetween. The frame also includes a shelf comprising a plate integrally coupled to the leg. The coffee bean pressing apparatus also includes a cylinder integrally coupled to the leg. The coffee bean pressing apparatus further comprises a piston member including a shaft being positioned in the cylinder. The shaft includes a hole with a lever removably coupled to it. The lever is hingedly coupled to the leg by a hinging member.

Still yet another object of the present invention is to provide a new manually operated coffee bean press that is easier and more comfortable to operate.

Even still another object of the present invention is to provide a new manually operated coffee bean press that that can be used to produce a wide variety of beverages such as coffee or expresso.

An even further object of the present invention is to provide a new manually operated coffee bean press that has a measuring indicia allowing users to gauge the amount of pressure they use in operating the invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
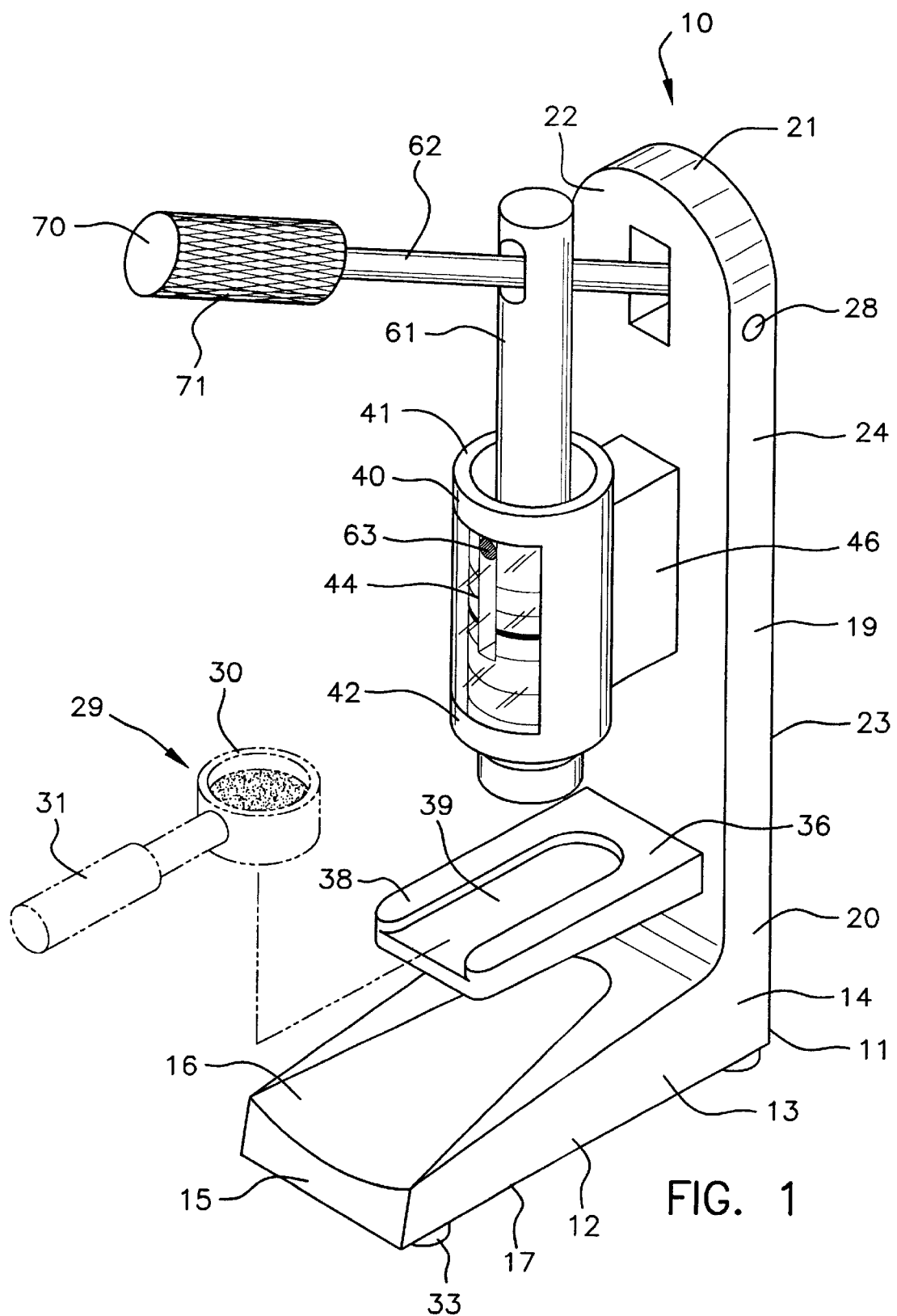
FIG. 1 is a schematic perspective view of a new manually operated coffee bean press according to the present invention.
Figure 2:
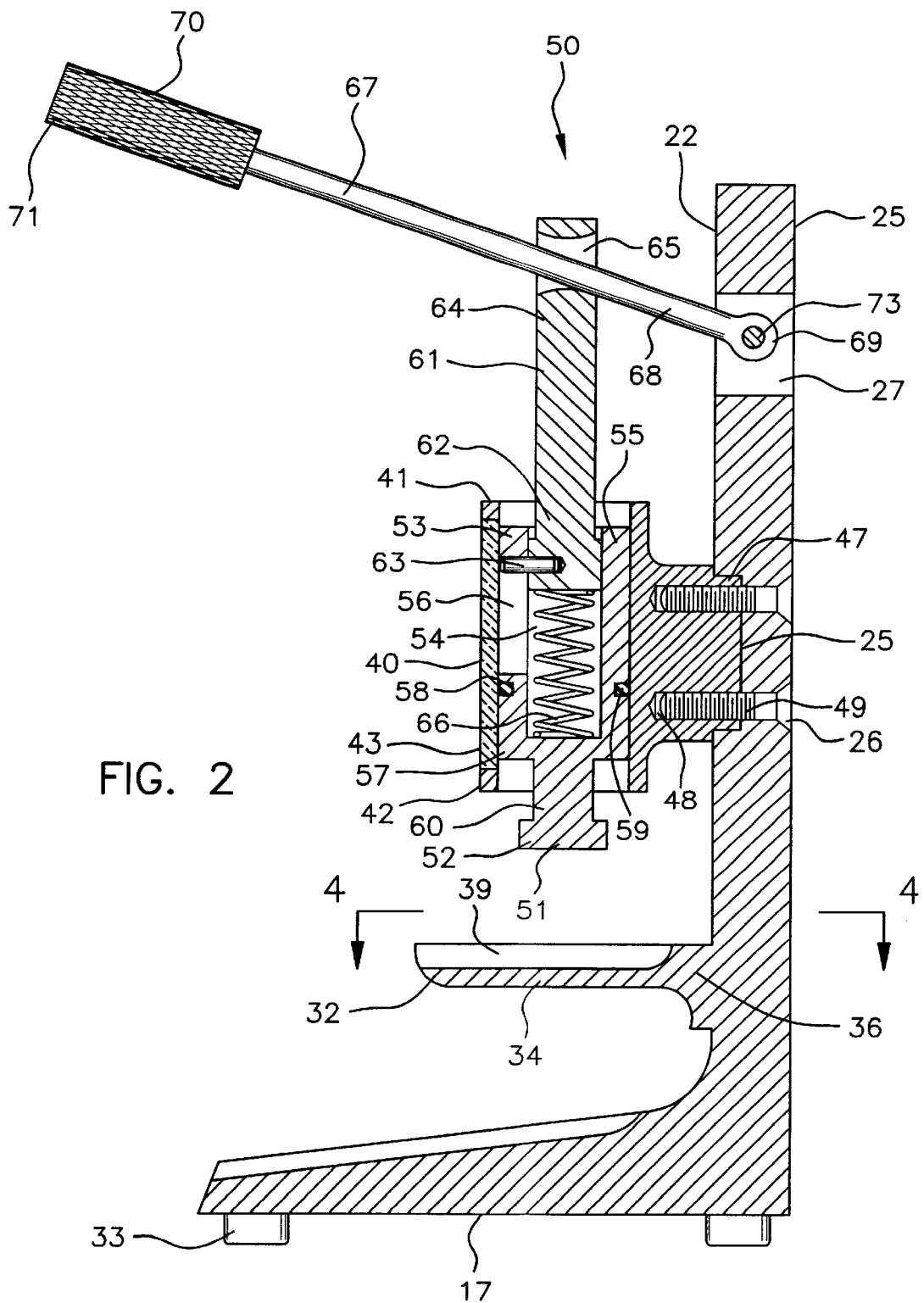
FIG. 2 is a schematic cross-sectional view of the present invention.
Figure 3:
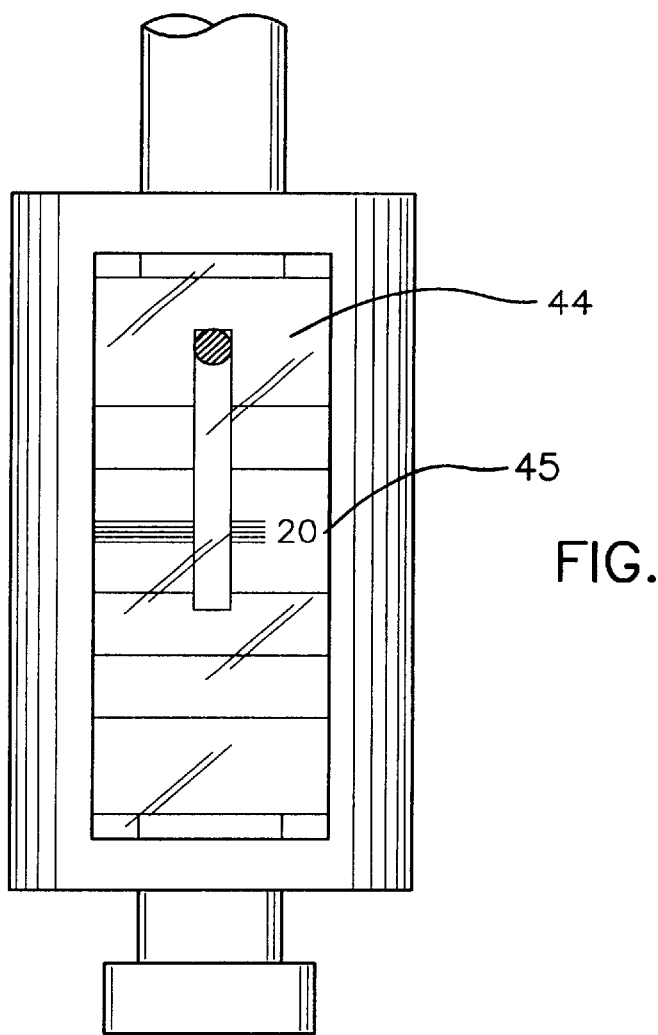
FIG. 3 is a schematic perspective view of the present invention showing measuring indicia.
Figure 4:
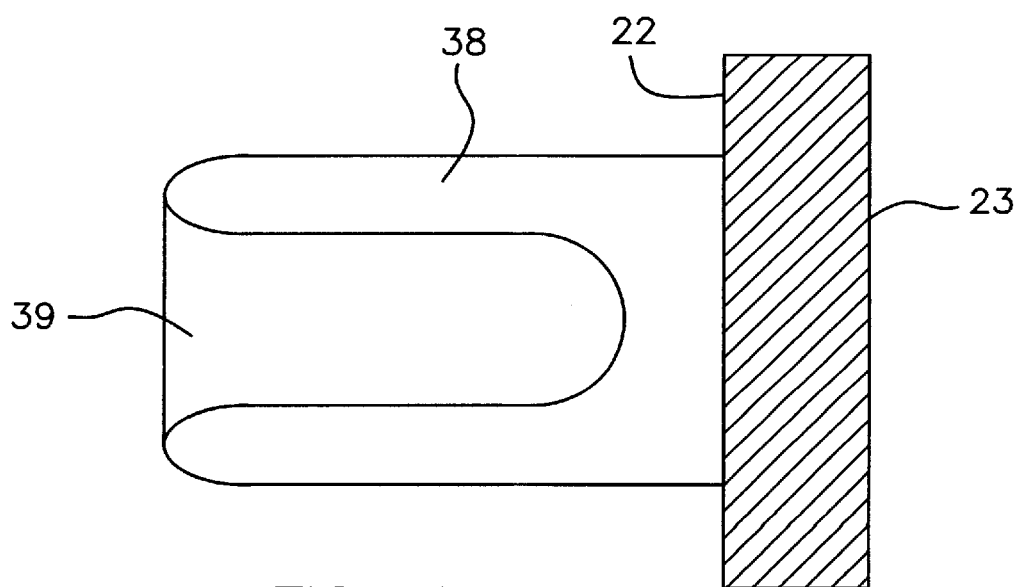
FIG. 4 is a schematic top view of the present invention taken along lines 4—4.

With reference now to the drawings, and in particular to FIGS. 1 through 4 thereof, a new manually operated coffee bean press embodying the principles and concepts of the present invention and generally designated by the reference numeral 10 will be described.

As best illustrated in FIGS. 1 through 4, the manually operated coffee bean press 10 generally comprises a manually operated coffee bean pressing apparatus comprising a frame 11. The frame 11 includes a base 12 and a leg 19. The base 12 includes a first end 14, a second end 15, a top surface 16 and a bottom surface 17. The base 12 also includes a pair of edges 13 tapering from the first end 14 toward the second end 15. The leg 19 includes a first end 20, a second end 21, a front side 22 and a back side 23 with a peripheral edge 24 extending therebetween. The first end 20 is integrally coupled to the top surface 16 and extending upwardly therefrom. The leg 19 is positioned generally adjacent to the first end 14 of the base 12. The front side 22 includes a notch 25 therein and is positioned generally between the first end 20 and the second end 21. The back side 23 of the leg includes a pair of holes 26 extending therethrough and extending into the notch 25. The pair of holes 26 is generally orientated parallel to the bottom surface 17 of the base 12. The front side 22 includes an aperture 27 therethrough and is positioned generally adjacent to the second end 21 of the leg 19. The peripheral edge 24 includes an opening therein extending into the aperture. The base 12 and the leg 19 are each comprised of a substantially rigid material.

The base 12 also includes a plurality of foot portions 33. The foot portions 33 are securably coupled to and extending downwardly away from the base 12.

The leg 19 includes a shelf 34 comprising a plate 35. The plate 35 includes a first end 36, a second end 37 and a top side 38. The first end 36 is securably coupled to the front side 22 of the leg. The shelf 34 is orientated generally perpendicular to the leg 19 and generally parallel to the bottom surface 17 of the base 12. The top side 38 includes a channel 39 extending therein from the second end 37. The channel 39 generally includes a U-shape. The shelf 34 is comprised of a substantially rigid material.

For use with the shelf 34, the invention has a container 29 comprising a cup portion 30 and a handle portion 31 securably coupled thereto. The cup portion 30 is removably positionable in the channel 39 of the shelf 34.

Connected to the leg 19 is an elongated cylinder 40. The cylinder 40 includes a first end 41, a second end 42, and a peripheral wall 43 extending therebetween. The cylinder 40 includes an opening therein extending through the first end 41 and second end 42. The peripheral wall 43 includes a generally transparent window 44 therein and is generally positioned between the first end 41 and the second end 42. The window 44 includes a measuring indicia 45 thereon. A protruding member 46 is integrally coupled to and extending away from the peripheral wall 43. The protruding member 46 includes a size and shape for positioning in the notch 25 of the leg 19. The second end 47 of the protruding member 25 includes a pair of bores 48 extending therein and positioned to relatively correspond with one of the holes 26 of the leg 19. A pair of fastening means 49 releasably fastening the protruding member 46 to the leg 19, such that the cylinder 40 is generally orientated parallel to the leg 19. Each of the fastening means 49 extend through one of the holes 26 and one of the corresponding bores 48. Each of the fastening means 49 comprising a screw. The cylinder 40 is comprised generally of a rigid material.

In the cylinder 40 is a piston member 50. The piston member 50 comprises a ramming portion 51. The ramming portion 51 includes a bottom end 52 and a top end 53 with a peripheral wall 55 extending therebetween. The top end 53 includes a bore 54 extending therein. The peripheral wall 55 of the ramming portion 51 includes a slot 56 therein and extending into the bore 54. The slot 56 is positioned generally adjacent to the window 44 of the cylinder 40. The ramming portion 51 includes a size and shape for extendably moving through the cylinder 40. An outer surface 57 of the peripheral wall 55 of the ramming portion 51 includes an annular groove 58 therein. An annular member 59 is positioned in the annular groove 58. A rod 60 is integrally coupled to the bottom end 52 of the ramming portion 51 and extending downwardly therefrom. The rod 60 includes a size and shape for removably positioning in the cup portion 30 of the container 29.

A shaft 61 is also located in the cylinder 40. The shaft 61 includes a first end 62 and a second end 64. The first end 62 of the shaft 61 includes a size and shape for extendably positioning in the bore 54 of the ramming portion 51. The first end 62 of the shaft 61 includes a measuring pin 63 securably coupled thereto and extending therefrom. The measuring pin 63 extending through the slot 56 of the peripheral wall 55 of the ramming portion 51. The shaft 61 includes a hole 65 therein positioned generally adjacent to the second end 64 of the shaft 61.

There is a biasing member 66 between the shaft 61 and the ramming portion 5. The biasing member 66 is positioned in the bore 54 and abutting the second end 64 of the shaft 61. The piston member 50 is comprised of a substantially rigid material.

To actuate the manually operated coffee bean apparatus 10 there is a lever 67. The lever 67 is elongated and includes a first end 68 and a second end 70. The first end 68 of the lever 67 includes a hole 69 therein and positioned generally adjacent to the first end 68 of the lever 67. The lever 67 extends through the hole 65 in the shaft 61 of the piston member 50. The first end 68 of the lever 67 extends into the aperture 27 of the leg 19. A gripping member 71 is integrally coupled to the second end 70 of the lever 67 and positioned generally adjacent to the second end 70. The gripping member 71 may include a variety of surfaces such as smooth or knurled.

Attaching the lever 67 to the leg 19 is a hinging member 73. The hinging member 73 extends through the opening 28 in the peripheral edge 24 of the leg 19 and through the hole 69 in the first end 68 of the lever 67 such that the lever 67 is hingedly coupled to the leg 19.

In use, coffee beans are placed into the cup portion 30 of the container 29. The container 29 is then placed into the channel 39 of the shelf 34. The user then uses the lever 67 to exert force on the shaft 61 of the piston member 50. The shaft 61 then exerts force, which is measurable from the measuring indicia 45 on the window 44, on the biasing member 66. The biasing member 66 then transfers the force to the ramming portion 51. The ramming portion 51 then enters the cup portion 30 of the container 29 extracting an amount of coffee from the coffee beans.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A manually operated coffee bean pressing apparatus comprising:

a frame, said frame including a base and a leg, said leg having a first end, a second end, a front side and a back side with a peripheral edge extending therebetween;

a shelf, said shelf comprising a plate, said plate being integrally coupled to said leg;

a cylinder, said cylinder being integrally coupled to said leg;

a piston member, said piston member having a shaft and being positioned in said cylinder;

a lever, said lever being removably coupled to a hole in said shaft; and a hinging member, said hinging member hingedly coupling said lever to said leg.

2. The manually operated coffee bean pressing apparatus of claim 1, wherein said manually operated coffee bean pressing apparatus further comprises:

said front side of said leg having a notch therein, said notch being positioned generally between said first and said second ends, said cylinder being elongated and having a first end and a second end, a peripheral wall extending therebetween; and said cylinder having an opening therein extending through said first and second ends, a protruding member being integrally coupled to and extending away from said peripheral wall, said protruding member having a size and shape for positioning in said notch of said leg.

3. The manually operated coffee bean pressing apparatus of claim 2, wherein said leg further comprises;

said back side of said leg having a pair of holes extending therethrough and extending into said notch, said protruding member having a second end, said second end of said protruding member having a pair of bores extending therein and positioned to relatively correspond with one of said holes of said leg; and a pair of fastening means releasably fastening said protruding member to said leg, each of said fastening means extending through one of said holes and one of said corresponding bores.

4. The manually operated coffee bean pressing apparatus of claim 1, wherein said leg further comprises:

said front side of said leg having a aperture therethrough, said aperture being positioned generally adjacent to said second end of said leg, said lever being elongated and having a first end and a second end, said first end of said lever having a hole therein and positioned generally adjacent to said first end of said lever, said first end of said lever extending into said aperture of said leg, said peripheral edge of said leg having a opening therein, said opening extending into said aperture, wherein said hinging member extends through said opening in said peripheral edge of said leg and through said hole in said first end of said lever such that said lever is hingedly coupled to said leg.

5. The manually operated coffee bean pressing apparatus of claim 4, wherein said second end of said lever further comprises:

said second end of said lever having a gripping member being integrally coupled thereto and positioned generally adjacent to said second end, said gripping member having a knurled surface.

6. The manually operated coffee bean pressing apparatus of claim 2, wherein said peripheral wall of said cylinder further comprises:

said peripheral wall having a generally transparent window therein being generally positioned between said first end and said second end.

7. The manually operated coffee bean pressing apparatus of claim 6, wherein said window further comprises:
   said window having a measuring indicia thereon.

8. The manually operated coffee bean pressing apparatus of claim 1, further comprising:
   a plurality of foot portions, said foot portions being securably coupled to and extending downwardly away from said base.

9. The manually operated coffee bean pressing apparatus of claim 2, further comprising:
   a plurality of foot portions, said foot portions being securably coupled to and extending downwardly away from said base.

10. The manually operated coffee bean pressing apparatus of claim 1, wherein said plate further comprises:
    said plate having a first end, a second end and a top side, said first end being securably coupled to said front side of said leg, said shelf being orientated generally perpendicular to said leg.

11. The manually operated coffee bean pressing apparatus of claim 10, wherein said top side of said plate further comprises:
    said top side having a channel extending therein from said second end, said channel generally having a U-shape.

12. The manually operated coffee bean pressing apparatus of claim 11, further comprising:
    a container, said container having a cup portion and a handle portion securably coupled thereto, said cup being removably positionable in said channel.

13. The manually operated coffee bean pressing apparatus of claim 1, wherein said piston member further comprises:
    a ramming portion, said ramming portion having a bottom end, and a top end with a peripheral wall extending therebetween, said top end having a bore extending therein, said peripheral wall of said ramming portion having a slot therein and extending into said bore, said ramming portion having a size and shape for extendably moving through said cylinder, a rod being integrally coupled to said bottom end of said ramming portion and extending downwardly therefrom, said rod having a size and shape for removably positioning in said cup of said container; and
    a shaft, said shaft having a first end and a second end, said first end of said shaft having a size and shape for being extendably positioned in said bore of said ramming portion.

14. The manually operated coffee bean pressing apparatus of claim 13, wherein said peripheral wall of said ramming portion further comprises:
    said peripheral wall of said ramming portion having an outer surface with an annular groove therein, an annular member being positioned in said annular groove.

15. The manually operated coffee bean pressing apparatus of claim 13, wherein said shaft further comprises:
    said first end of said shaft having a measuring pin securably coupled thereto and extending therefrom, said measuring pin extending through said slot of said peripheral wall of said ramming portion, said shaft having a hole therein positioned generally adjacent to said second end of said shaft.

16. The manually operated coffee bean pressing apparatus of claim 13, further comprising:
    a biasing member, said biasing member being positioned in said bore and abutting said second end of said shaft.

17. A manually operated coffee bean pressing apparatus comprising:

a frame, said frame including a base and a leg, said base having a first end, second end, top surface and bottom surface, said base having a pair of edges tapering from said first end toward said second end, said leg having a first end, a second end, a front side and a back side with a peripheral edge extending therebetween, said first end being integrally coupled to said top surface and extending upwardly therefrom, said leg being positioned generally adjacent to said first end of said base, said front side having a notch therein, said notch being positioned generally between said first and said second ends, said back side of said leg having a pair of holes extending therethrough and extending into said notch, said pair of holes being generally orientated parallel to said bottom surface of said base, said front side having a aperture therethrough, said aperture being positioned generally adjacent to said second end of said leg, said peripheral edge having a opening therein, said opening extending into said slot, said base and said leg, each being comprised of a substantially rigid material;

a plurality of foot portions, said foot portions being securably coupled to and extending downwardly away from said base;

a shelf, said shelf comprising a plate, said plate having a first end, a second end and a top side, said first end being securably coupled to said front side of said leg, said shelf being orientated generally perpendicular to said leg and generally parallel to said bottom surface of said base, said top side having a channel extending therein from said second end, said channel generally having a U-shape, said shelf being comprised of a substantially rigid material;

a container, said container having a cup portion and a handle portion securably coupled thereto, said cup being removably positionable in said channel;

a cylinder, said cylinder being elongated and having a first end and a second end, a peripheral wall extending therebetween, said cylinder having an opening therein extending through said first and second ends, said peripheral wall having a generally transparent window therein being generally positioned between said first end and said second end, said window having a measuring indicia thereon, a protruding member being integrally coupled to and extending away from said peripheral wall, said protruding member having a size and shape for positioning in said notch of said leg, said second end of said protruding member having a pair of bores extending therein and positioned to relatively correspond with one of said holes of said leg, a pair of fastening means releasably fastening said protruding member to said leg, such that said cylinder is generally orientated parallel to said leg, each of said fastening means extending through one of said holes and one of said corresponding bores, each of said fastening means comprising a screw, said cylinder being comprised generally of a rigid material;

a piston member, said piston member comprising:
   a ramming portion, said ramming portion having a bottom end, and a top end with a peripheral wall extending therebetween, said top end having a bore extending therein, said peripheral wall of said ramming portion having a slot therein and extending into said bore, said slot being positioned generally adjacent to said window of said cylinder, said ramming portion having a size and shape for extendably moving through said cylinder, an outer surface of said peripheral wall of said ramming portion having an annular groove therein, an annular member being positioned in said annular groove, a rod being integrally coupled to said bottom end of said ramming portion and extending downwardly therefrom, said rod having a size and shape for removably positioning in said cup of said container;

a shaft, said shaft having a first end and a second end, said first end of said shaft having a size and shape for being extendably positioned in said bore of said ramming portion, said first end of said shaft having a measuring pin securably coupled thereto and extending therefrom, said measuring pin extending through said slot of said peripheral wall of said ramming portion, said shaft having a hole therein positioned generally adjacent to said second end of said shaft;

a biasing member, said biasing member being positioned in said bore and abutting said second end of said shaft, said piston member being comprised of a substantially rigid material; and a lever, said lever being elongated and having a first end and a second end, said first end of said lever having a hole therein and positioned generally adjacent to said first end of said lever, said lever extending through said hole in said shaft of said piston member, said first end of said hinging member extending into said aperture of said leg, a gripping member being integrally coupled to said second end of said lever and positioned generally adjacent to said second end, said gripping member having a knurled surface;

a hinging member extending through said opening in said peripheral edge of said leg and through said hole in said second end of said lever such that said lever is hingedly coupled to said leg.

* * * * *